(12) United States Patent
Guo et al.

(10) Patent No.: US 12,287,938 B2
(45) Date of Patent: Apr. 29, 2025

(54) TOUCH CONTROL PROCESSING METHOD AND DEVICE THAT DETERMINES IF A TOUCH CONTROL INSTRUCTION IS A SLIDING INSTRUCTION, STORAGE MEDIUM, AND MOBILE TERMINAL

(71) Applicant: HUIZHOU TCL MOBILE COMMUNICATION CO., LTD., Guangdong (CN)

(72) Inventors: Hengjun Guo, Guangdong (CN); Guangyue Luo, Guangdong (CN); Yunguo Zhao, Guangdong (CN)

(73) Assignee: HUIZHOU TLC MOBILE COMMUNICATION CO., LTD., Guangdong (CN)

( * ) Notice: Subject to any disclaimer, the term of this patent is extended or adjusted under 35 U.S.C. 154(b) by 0 days.

(21) Appl. No.: 18/693,534

(22) PCT Filed: Aug. 3, 2022

(86) PCT No.: PCT/CN2022/109921
§ 371 (c)(1),
(2) Date: Mar. 20, 2024

(87) PCT Pub. No.: WO2023/045576
PCT Pub. Date: Mar. 30, 2023

(65) Prior Publication Data
US 2024/0385717 A1  Nov. 21, 2024

(30) Foreign Application Priority Data

Sep. 23, 2021 (CN) .......................... 202111112979.8

(51) Int. Cl.
*G06F 3/041* (2006.01)
*G06F 3/0488* (2022.01)

(52) U.S. Cl.
CPC .......... *G06F 3/0418* (2013.01); *G06F 3/0488* (2013.01)

(58) Field of Classification Search
None
See application file for complete search history.

(56) References Cited

U.S. PATENT DOCUMENTS

2011/0157029 A1*  6/2011  Tseng .................. G06F 3/04883
  345/173
2011/0316797 A1*  12/2011  Johansson .......... G06F 3/04847
  345/173

(Continued)

FOREIGN PATENT DOCUMENTS

CN  101943995 A  1/2011
CN  105094673 A  11/2015

(Continued)

OTHER PUBLICATIONS

International Search Report in International application No. PCT/CN2022/109921, mailed on Nov. 2, 2022.

(Continued)

*Primary Examiner* — Kirk W Hermann
(74) *Attorney, Agent, or Firm* — PV IP PC; Wei Te Chung

(57) ABSTRACT

A touch control processing method is applied to a mobile terminal. A display screen of the mobile terminal is configured with an edge area and a near-edge area that are connected, the edge area is located at a peripheral edge position of the display screen, the edge area surrounds the near-edge area. The method is used to, when receiving a touch control instruction inputted by a user, and determining that a first frame coordinate is in the near-edge area and a sliding direction of the sliding instruction is not toward an original area, supplement a point coordinate supplement at a position in the edge area symmetrical to the second frame coordinate about the first frame coordinate, which is taken as a datum, opposite to the sliding direction.

17 Claims, 7 Drawing Sheets

(56) References Cited

U.S. PATENT DOCUMENTS

| | | | | |
|---|---|---|---|---|
| 2012/0304107 A1* | 11/2012 | Nan | ................... | G06F 3/04883 |
| | | | | 715/810 |
| 2013/0278808 A1* | 10/2013 | Tokairin | ............. | H04N 1/00411 |
| | | | | 348/333.01 |
| 2018/0336543 A1* | 11/2018 | Van Os | ................... | G06F 3/167 |

FOREIGN PATENT DOCUMENTS

| | | | | | |
|---|---|---|---|---|---|
| CN | 105511776 | A | | 4/2016 | |
| CN | 106775392 | A | | 5/2017 | |
| CN | 109002215 | A | * | 12/2018 | ........... G06F 3/0412 |
| CN | 111966256 | A | | 11/2020 | |
| CN | 112083837 | A | | 12/2020 | |
| CN | 113849082 | A | | 12/2021 | |
| EP | 3454193 | A1 | | 3/2019 | |
| TW | 201719350 | A | * | 6/2017 | ........... G06F 3/0412 |
| WO | WO-2017197636 | A1 | * | 11/2017 | |
| WO | 2020233292 | A1 | | 11/2020 | |

OTHER PUBLICATIONS

Written Opinion of the International Search Authority in International application No. PCT/CN2022/109921, mailed on Nov. 2, 2022.

Chinese Office Action issued in corresponding Chinese Patent Application No. 202111112979.8 dated Jul. 19, 2023, pp. 1-10.

\* cited by examiner

TOUCH CONTROL PROCESSING METHOD AND DEVICE THAT DETERMINES IF A TOUCH CONTROL INSTRUCTION IS A SLIDING INSTRUCTION, STORAGE MEDIUM, AND MOBILE TERMINAL

This application is a US national phase application based upon an International Application No. PCT/CN2022/109921, filed on Aug. 3, 2022, which claims priority to the Chinese patent application NO. 202111112979.8, filed on Sep. 23, 2021. The disclosures of the aforementioned applications are incorporated herein by reference in their entireties.

TECHNICAL FIELD

The present disclosure relates to the field of mobile terminals, and in particular, to a touch control processing method and device, a storage medium, and a mobile terminal.

BACKGROUND

Mobile terminals have become indispensable electronic products for people's lives. A mobile terminal includes various applications. Operations of applications include sliding operations, such as left and right sliding on the desktop, sliding at edges to flip web pages, and quickly sliding direction keys in gun battle games. These operations are related to an edge area of the mobile terminal, and touch control sliding is initiated from the edge area of the mobile terminal.

Currently, a peripheral area of the display screen of the mobile terminal is set to have a curvature. When a user's finger slides from the edge area into the screen, a variation of the touch control difference of the edge area is slightly different from that of a flat area, resulting in an unsmooth sliding.

SUMMARY

In a first aspect, some embodiments of the present disclosure provide a touch control processing method, applied to a mobile terminal. A display screen of the mobile terminal is configured with an edge area and a near-edge area that are connected, the edge area is located at a peripheral edge position of the display screen. The edge area surrounds the near-edge area. The method includes:
  receiving a touch control instruction inputted by a touch;
  determining whether the touch control instruction is a sliding instruction;
  in response to determining that the touch control instruction is not the sliding instruction, performing a touch operation corresponding to the touch control instruction, and
  in response to determining that the touch control instruction is the sliding instruction, collecting a first frame coordinate of the sliding instruction;
  determining whether the first frame coordinate is in the near-edge area;
  in response to determining that the first frame coordinate is not in the near-edge area, performing a sliding operation corresponding to the sliding instruction, and
  in response to determining that the first frame coordinate is in the near-edge area, collecting a second frame coordinate of the sliding instruction;
  determining whether a sliding direction of the sliding instruction is toward the edge area based on the first frame coordinate and the second frame coordinate; and
  in response to determining that the sliding direction of the sliding instruction is toward the edge area, determining that the sliding instruction is invalid, and
  in response to determining that the sliding direction of the sliding instruction is not toward the edge area, supplementing a point coordinate at a position in the edge area symmetrical to the second frame coordinate about the first frame coordinate, which is taken as a datum, opposite to the sliding direction.

In a second aspect, some embodiments of the present disclosure further provide a mobile terminal, including a display screen, a processor, and a memory. The display screen is configured with an edge area and a near-edge area that are connected. The edge area is located at a peripheral edge position of the display screen. The edge area surrounds the near-edge area. The processor is electrically connected to the memory. The memory is configured to store instructions and data. The processor is configured to perform the touch control processing method as described above.

In a third aspect, some embodiments of the present disclosure further provide a touch control processing method applied to a mobile terminal, wherein a display screen of the mobile terminal is configured with an edge area and a near-edge area that are connected, and the edge area is located at a peripheral edge position of the display screen, the edge area surrounds the near-edge area, and the method includes:
  receiving a touch control instruction inputted by a touch;
  determining whether the display screen is in a lock state;
  in response to determining that the display screen is in the lock state, displaying a start-up screen message on the display screen and determining that the touch control instruction is invalid, and
  in response to determining that the display screen is not in the lock state, determining whether the touch control instruction is a sliding instruction;
  in response to determining that the touch control instruction is not the sliding instruction, performing a touch operation corresponding to the touch control instruction, and
  in response to determining that the touch control instruction is the sliding instruction, collecting a first frame coordinate of the sliding instruction;
  determining whether the first frame coordinate is in the near-edge area;
  in response to determining that the first frame coordinate is not in the near-edge area, performing a sliding operation corresponding to the sliding instruction, and
  in response to determining that the first frame coordinate is in the near-edge area, collecting a second frame coordinate of the sliding instruction;
  determining whether a sliding direction of the sliding instruction is toward the edge area based on the first frame coordinate and the second frame coordinate; and
  in response to determining that the sliding direction of the sliding instruction is toward the edge area, determining that the sliding instruction is invalid, and
  in response to determining that the sliding direction of the sliding instruction is not toward the edge area, supplementing a point coordinate at a position in the edge area symmetrical to the second frame coordinate about the first frame coordinate, which is taken as a datum, opposite to the sliding direction.

BRIEF DESCRIPTION OF THE DRAWINGS

To more clearly illustrate the technical solutions in embodiments of the present disclosure, the drawings required to be used in the embodiments will be briefly introduced below. It is apparent that the drawings in the following descriptions are only some embodiments of the present disclosure. Those of ordinary skill in the art may obtain other drawings based on these drawings without exerting creative efforts.

Technical solutions in embodiments of the present disclosure will be clearly and completely described below with reference to the accompanying drawings in the embodiments of the present disclosure. It is apparent that the described embodiments are only some of the embodiments of the present disclosure, rather than all the embodiments. Based on the embodiments in the present disclosure, all other embodiments obtained by those skilled in the art without making creative efforts fall within the scope of protection of the present disclosure.

The embodiments of the present disclosure provide a touch control processing method and device, a storage medium, and a mobile terminal, which are mainly applicable to a mobile terminal whose display screen has a curved periphery, to solve a sliding breakpoint problem and a sliding delay problem caused by the curvature, making sliding smoother.

The touch control processing method and device, the storage medium, and the mobile terminal will be described in detail below.

Figure 1:
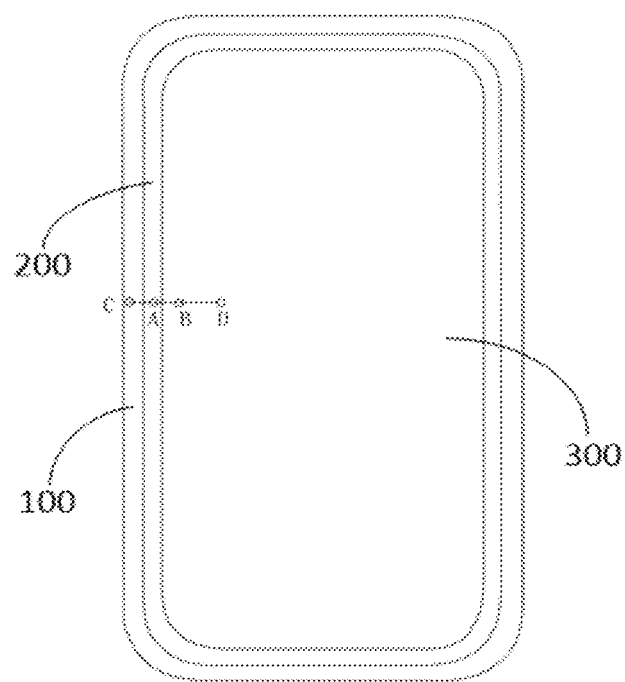
FIG. 1 is a schematic structural diagram of a mobile terminal provided by some embodiments of the present disclosure.

Please refer to FIG. 1. FIG. 1 is a schematic structural diagram of a mobile terminal provided by some embodiments of the present disclosure. The mobile terminal includes a display screen, a memory, and a processor. The display screen is used to display a page of the mobile terminal. The memory and the processor are electrically connected. The memory is used to store instructions and data. The processor is a core control element of the entire mobile terminal.

In some embodiments of the present disclosure, the mobile terminal may be a frameless mobile phone. A front of the mobile phone is covered by a display screen, and a periphery of the display screen or left and right sides of the display screen are made with a curvature to improve the overall aesthetics of the mobile phone.

As an example, the display screen includes an edge area 100 and a near-edge area 200. The edge area 100 is located at a peripheral position of the display screen. The peripheral position refers to a position of a peripheral frame of the display screen or positions of left and right frames of the display screen. The edge region 100 surrounds the near-edge area 200.

As an example, in addition to the edge area 100 and the near-edge area 200, the display screen further includes a middle area 300. The middle area 300 of the display screen is flat, and the near-edge area 200 surrounds the middle area 300.

It may be understood that since the edge area 100 is made with a curvature and has a small width, when a user starts performing a sliding operation from the edge area 100 toward the middle area 300, a breakpoint phenomenon is likely to occur. That is, a connection line of the sliding action on the display screen is not displayed in the edge area 100. Or, a variation of touch control difference of the edge area is slightly different from that of a flat area of the display screen, resulting in sliding delay and affecting a sliding effect.

Figure 2:
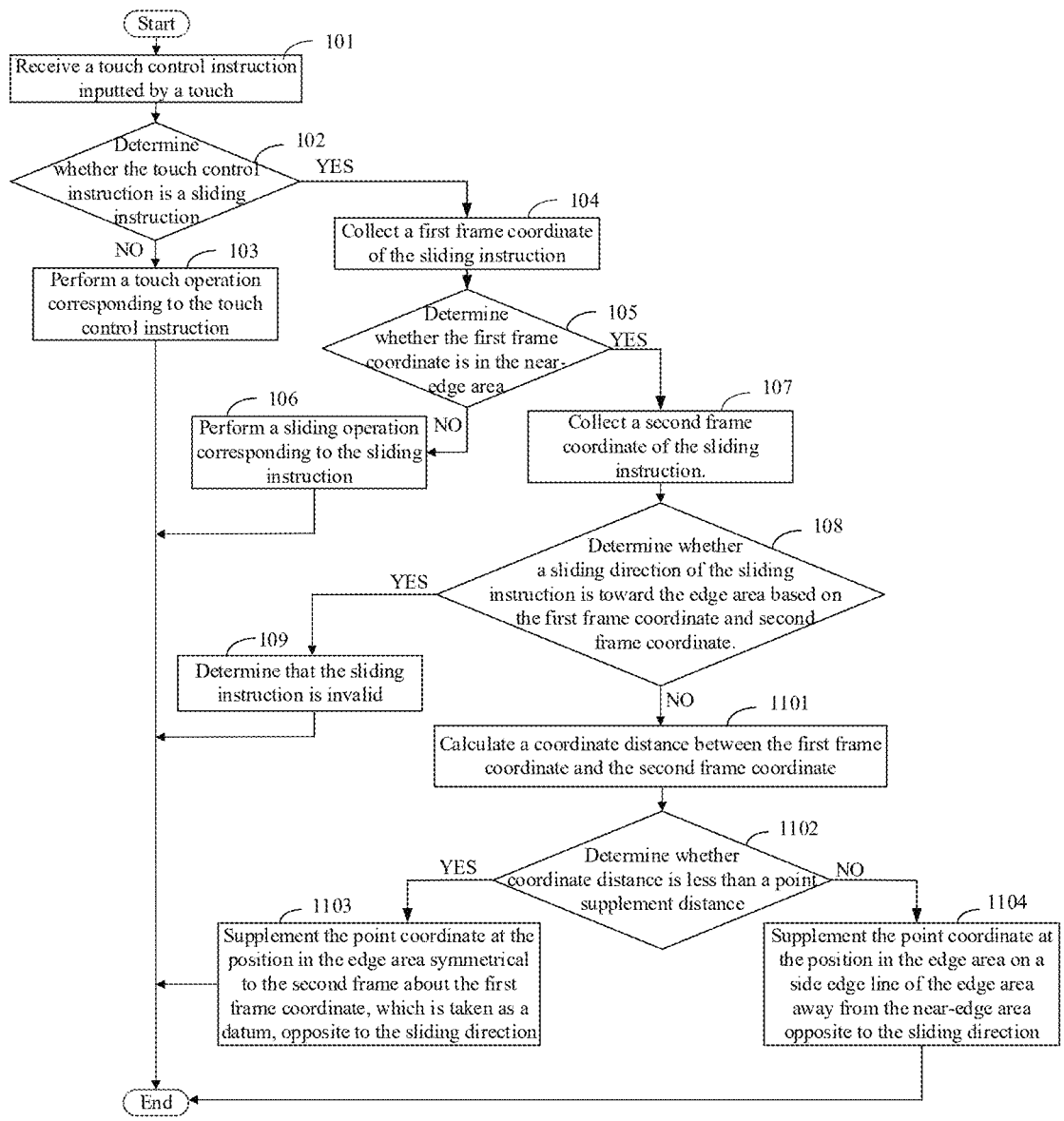
FIGS. 2, 2A, 2B and 2C illustrate flow charts of touch control processing methods provided by some embodiments of the present disclosure.

Please refer to FIG. 2. FIG. 2 a flow chart of a touch control processing method provided by some embodiments of the present disclosure. The method is applied to the above-mentioned mobile terminal. The display screen of the mobile terminal is set with the edge area and the near-edge area that are connected. The edge area is located at the peripheral edge position of the display screen, and the edge area surrounds the near-edge area. The method includes the following operations.

In operation 101, a touch control instruction inputted by a touch is received.

A user inputs an instruction by touching the display screen to control a change in a page of the display screen. In addition to a sliding operation, the display screen may also be controlled by a clicking operation. The user inputs the touch control instruction on the display screen through manual triggering. The touch control instruction may be a click instruction or a sliding instruction.

It is determined whether the touch control instruction is a sliding instruction. If not, an operation 103 is performed. If so, an operation 104 is performed.

The above-mentioned touch control instruction may be a click instruction or a sliding instruction. By judging and identifying the touch control instruction, whether the touch control instruction is a sliding instruction is determined.

Optionally, the touch control instruction may be a false touch instruction. After a corresponding type of the instruction is determined, a subsequent control may be performed according to the type corresponding to each instruction.

In some embodiments of the present disclosure, after receiving the touch control instruction of the inputted by the touch, the method further includes: determining whether the display screen is in a lock state (operation 1011); if so, displaying a start-up screen message on the display screen and determining that the touch control instruction is invalid (operation 1012), or else, determining whether the touch control instruction is a sliding instruction.

The display screen of the mobile terminal may be in a lock state or in a start-up state, and the touch control instruction input by the user may be a conscious input or an unconscious input. For example, the touch control instruction may be generated by the user's faulty touch.

After receiving the touch control instruction, the mobile terminal analyses and determines a state of the display screen. When the display screen is in the start-up state, the touch control instruction may be considered to be consciously input by the user, and a subsequent operation (that is, determining whether the touch control instruction is a sliding instruction) may be performed. When the display screen is in the lock state, the touch control instruction may be considered to be generated by the user's faulty touch or the user's conscious input. At this time, the start-up screen message is displayed on the display screen. The start-up screen message may be a Short Messaging Service (SMS) verification message, a face recognition message, a voice start-up message, etc., and the touch control instruction is determined to be invalid. The user may re-enter the corresponding touch control information after unlocking the display screen.

A touch operation corresponding to the touch control instruction is performed.

If determined not a sliding instruction, the touch control instruction may be a click instruction input by the user, and then the corresponding touch operation may be performed.

Several virtual buttons are provided on the display screen, and the user may control each virtual button by inputting a click instruction, so that the corresponding virtual button performs a corresponding operation.

A first frame coordinate of the sliding instruction is collected.

When the touch control instruction is determined to be a sliding instruction, the display screen should include several frame coordinate points, which are connected to form a sliding trajectory, corresponding to the sliding action of the sliding instruction input by the user. The mobile terminal responds to the corresponding functional operation through the sliding instruction.

After it is determined that the touch control instruction is a sliding instruction, the first frame coordinate point of the sliding instruction is collected, and the first frame coordinate is a coordinate point of a starting position of the sliding instruction.

In some embodiments of the present disclosure, before collecting the first frame coordinate of the sliding instruction, the method further includes: determining whether a point supplement mechanism of the mobile terminal is activated (operation 1021); and if so, collecting the first frame coordinate of the sliding instruction, or else, displaying a point supplement activation message on the display screen (operation 1022).

It should be noted that not all sliding operations require point supplement. The touch control processing method in the embodiments of the present disclosure is suitable for situations where a starting coordinate is in the near-edge area. Correspondingly, the point supplement mechanism is applied to situations where the starting coordinate is in the near-edge area.

When using the mobile terminal, generally, the user needs to use the point supplement mechanism to make the sliding operation smoother only when playing gun games, controlling web pages around the periphery of the display screen with one hand, or the like. However, when the user watches videos, listens to music, or takes photos, there is no need to run the point supplement mechanism.

The point supplement mechanism is configured in the mobile terminal, and is activated or deactivated through a configuration of a switch button. Users may set the activation of the point supplement mechanism on their own, or the users may be prompted to select by displaying a message when the sliding instruction is detected.

Only after the sliding instruction is detected and the point supplement mechanism is activated, the coordinate point of the sliding instruction is collected for a subsequent operation.

Whether the first frame coordinate is in the near-edge area is determined. If not, an operation 106 is performed. If so, an operation 107 is performed.

After the first frame coordinate of the sliding instruction is collected, a position of the first frame coordinate is determined. A system of the mobile terminal determines whether the first frame coordinate is in the near-edge area, thereby determining whether to perform a subsequent corresponding operation.

The sliding operation corresponding to the sliding instruction is performed.

If not in the near-edge area, the first frame coordinate of the sliding instruction is in the edge area or the middle area. Regardless of whether the first frame coordinate is in the edge area or in the middle area, it indicates that the sliding trajectory corresponding to the sliding instruction is continuous, and the sliding operation corresponding to the sliding instruction may be performed smoothly. Thus, there is no need to perform the point supplement, and thus no need to perform the subsequent related operation.

After it is determined that the first frame coordinate is not in the near-edge area, the sliding operation corresponding to the sliding instruction may be performed.

In some embodiments of the present disclosure, after collecting the first frame coordinate of the sliding instruction, the method further includes: determining whether the first frame coordinate is in the edge area (operation 1041); and if so, performing the sliding operation corresponding to the sliding instruction (operation 106), or else, determining whether the first frame coordinate is in the near-edge area (operation 105).

After collecting the first frame coordinate of the sliding instruction, it is determined whether the first frame coordinate is in the edge area. If the first frame coordinate is in the edge area, it indicates that the sliding trajectory corresponding to the sliding instruction is continuous and the sliding operation may be performed smoothly. Thus, there is no need to perform the point supplement, and the corresponding operation may be directly performed.

After it is determined that the first frame coordinate is not in the edge area, the first frame coordinate may be in the near-edge area or in the middle area, then it is determined whether the first frame coordinate is in the near-edge area.

Figure 2A:
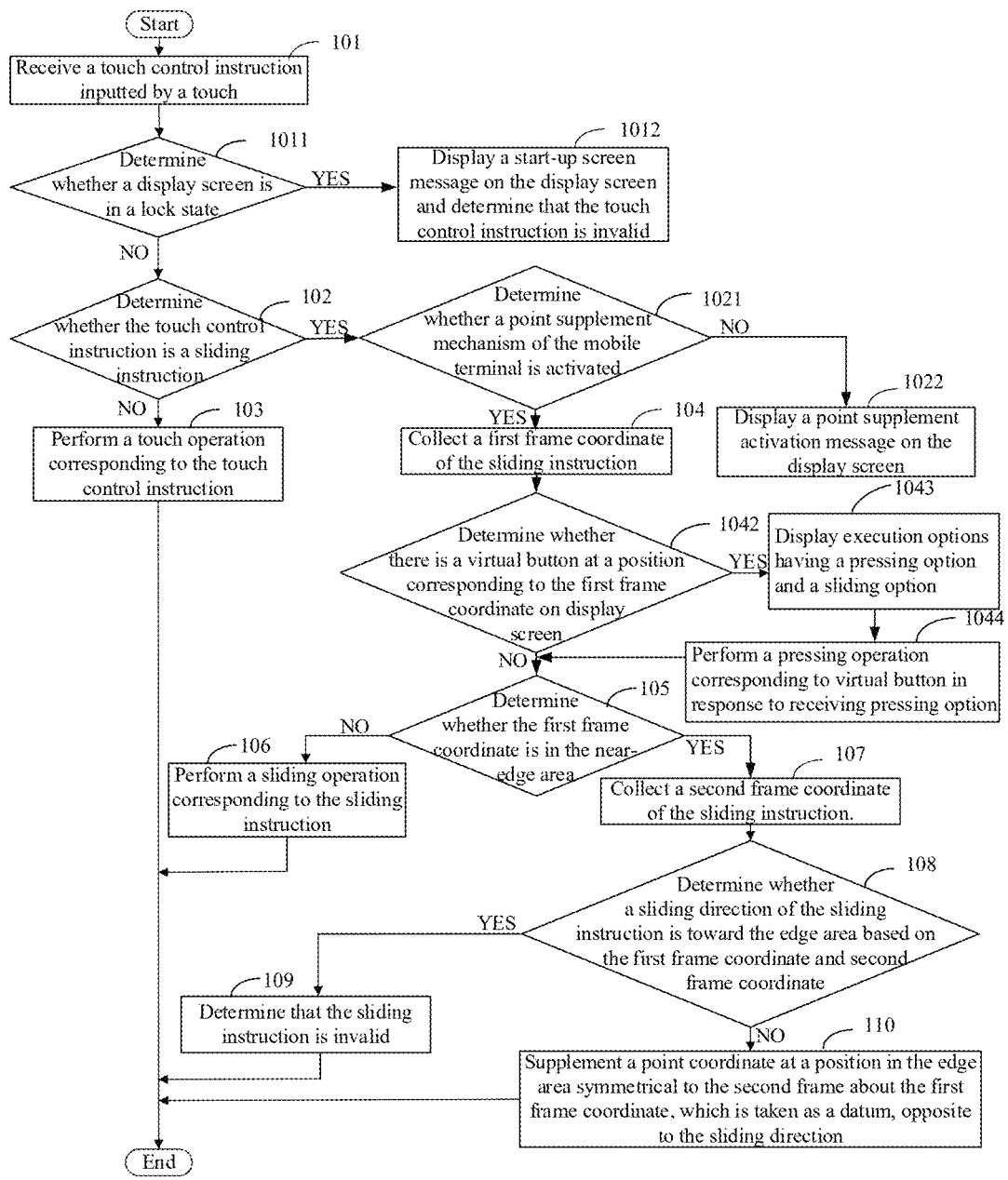

Please refer to FIG. 2A, in some embodiments of the present disclosure, after collecting the first frame coordinate of the sliding instruction (operation 104), the method further includes: determining whether there is a virtual button at a position corresponding to the first frame coordinate on the display screen (operation 1042); if not, determining whether the first frame coordinate is in the near-edge area, and if so, displaying execution options on the display screen (operation 1043), wherein the execution options include a pressing option and a sliding option, the pressing option corresponds to the virtual button, and the sliding option corresponds to the sliding instruction; for a received pressing option, performing the pressing operation corresponding to the virtual button (operation 1044); and for a received sliding option, determining whether the first frame coordinate is in the near-edge area (operation 105).

Since there are several virtual buttons on the display screen, the user may trigger a certain virtual button when performing a sliding operation. When there is a virtual button at the position corresponding to the first frame coordinate of the sliding instruction triggered by the user, the display screen displays the options for the user to select, and the user selects an option for execution to make the mobile terminal respond to the corresponding operation.

Figure 2B:
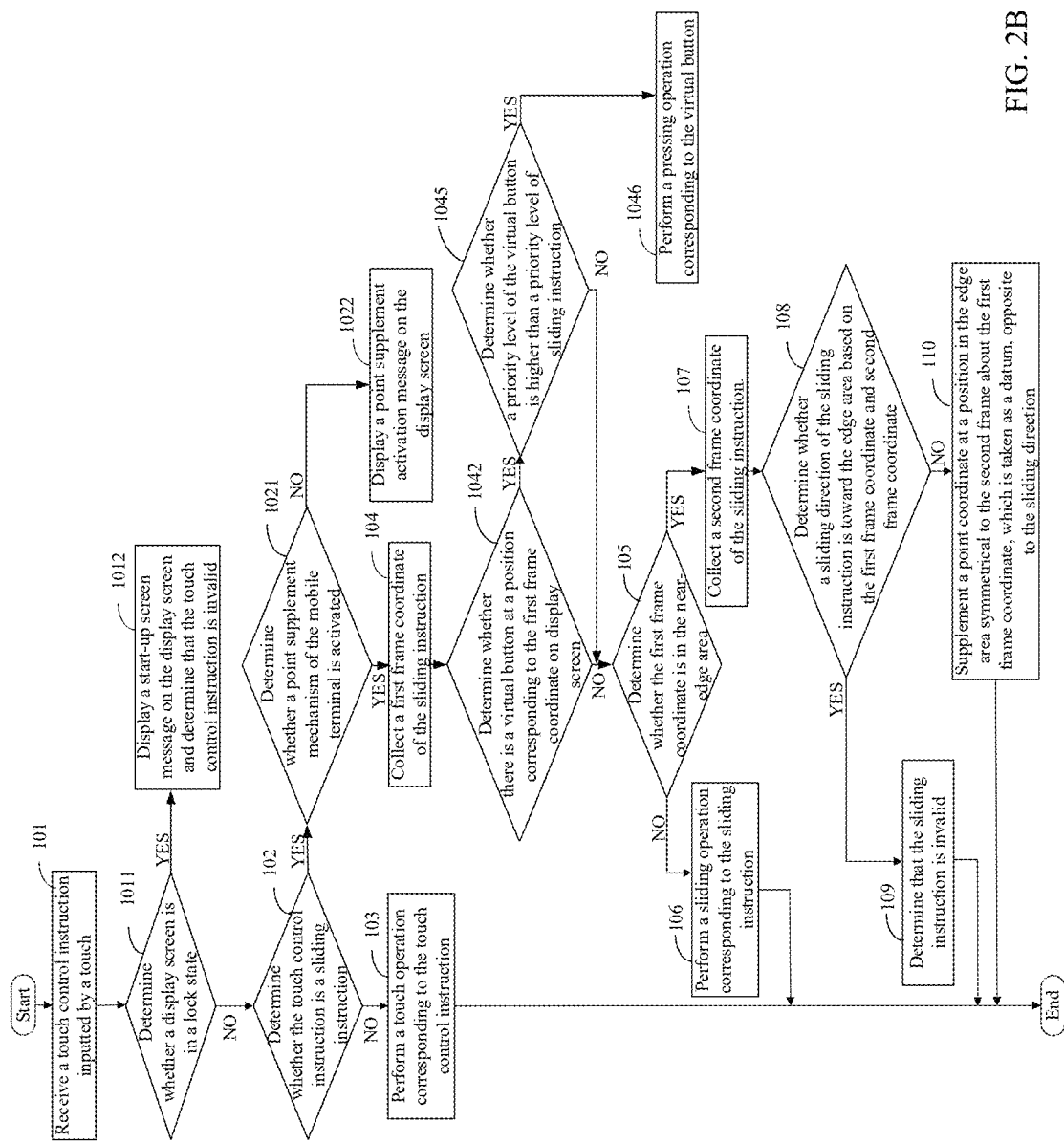

Please refer to FIG. 2B, in some embodiments of the present disclosure, after collecting the first frame coordinate of the sliding instruction (operation 104), the method further includes: determining whether there is a virtual button at a position corresponding to the first frame coordinate on the display screen (operation 1042); if not, determining whether the first frame coordinate is in the near-edge area; and if so, determining whether a priority level corresponding to the virtual button is higher than a priority level corresponding to the sliding instruction (operation 1045), if so, performing a pressing operation corresponding to the virtual button (operation 1046), or else, determining whether the first frame coordinate is in the near-edge area (operation 105).

The priority levels of the instructions may be set by the system itself. For example, when the system detects that the mobile terminal is running a game program, the priority level of the sliding instruction may be set to be higher than the priority level of the pressing instruction. When the system detects that the program run by the mobile terminal is switched to a video program, the priority of the pressing instruction may be adjusted to be higher than the priority of sliding instruction.

The priority levels of the instructions may be set by the user. For example, before playing a game, the user may set the priority level of the sliding instruction to be higher than the priority level of the pressing instruction. After the user switches the running program to the video program, the user may adjust the priority level of the pressing instruction to be higher than the priority level of the sliding instruction.

A second frame coordinate of the sliding instruction is collected.

After it is determined that the first frame coordinate is in the near-edge area, the sliding operation corresponding to the sliding instruction may not be smooth, and thereby the second frame coordinate of the sliding instruction is collected.

Optionally, after the collection of the second frame coordinate, a determination may be performed. When the second frame coordinate are in the edge area, the sliding instruction may be regarded as invalid. When the second frame coordinate is in the near-edge area, a third frame coordinate instruction of the sliding instruction is collected, and a subsequent operation may be performed in combination with three frame coordinates.

Optionally, in some embodiments of the present disclosure, several frame coordinates of the sliding instruction may be combined to perform a subsequent operation. The embodiments of the present disclosure only use two frame coordinates for detailed description, but the number of coordinates is not limited herein.

In operation 108, whether a sliding direction of the sliding instruction is toward the edge area is determined based on the first frame coordinate and the second frame coordinate. If so, an operation 109 is performed. If not, an operation 110 is performed.

After the first frame coordinate and the second frame coordinate are collected, the sliding direction of the sliding instruction may be obtained based on the first frame coordinate and the second frame coordinate. The sliding direction is from the first frame coordinate to the second frame coordinate, thus whether the sliding direction of the sliding instruction is towards the edge area is known.

Figure 2C:
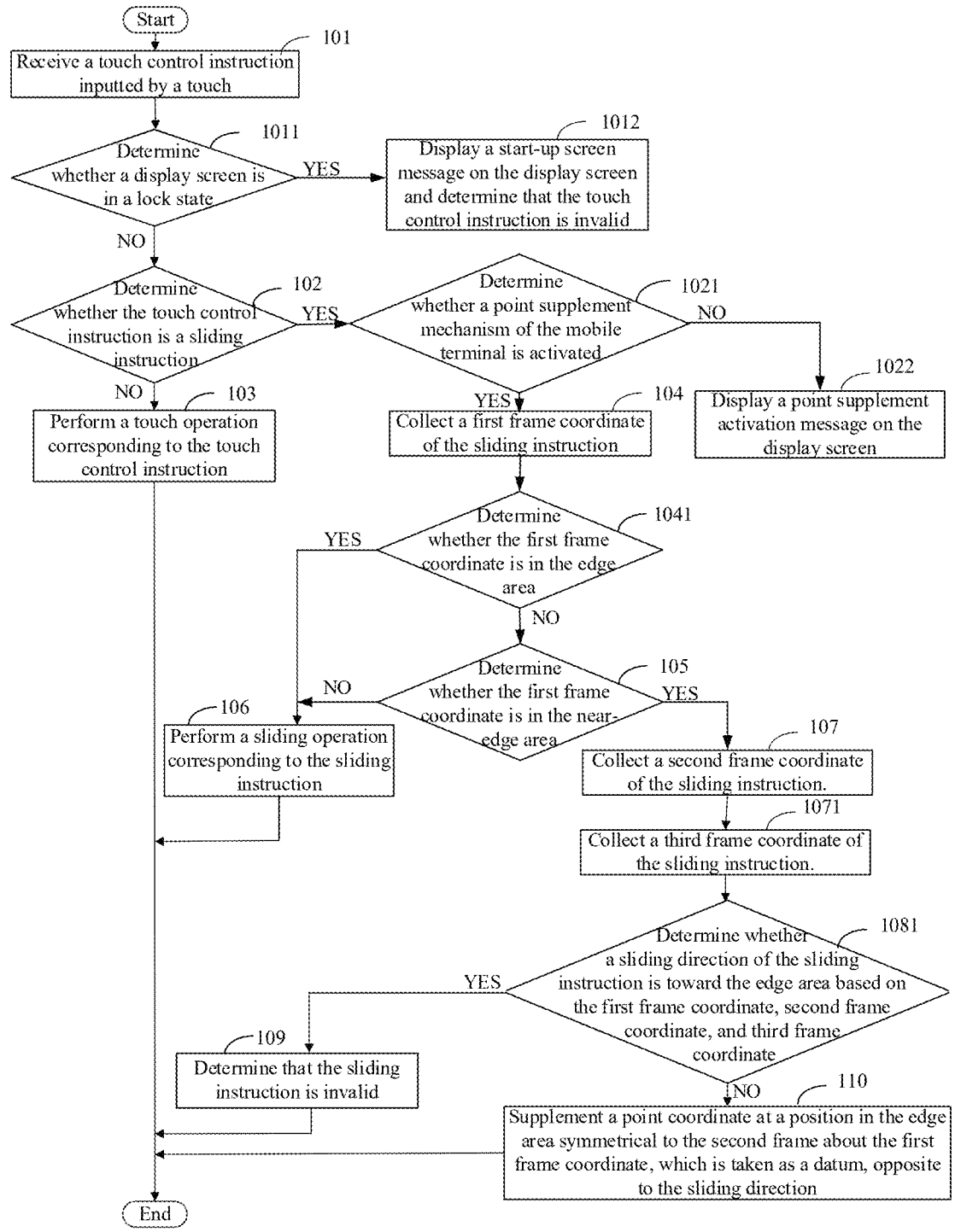

Optionally, please refer to FIG. 2C, after the first frame coordinate and the second frame coordinate are collected, the third frame coordinate of the sliding instruction is further collected (operation 1071), and the sliding direction of the sliding instruction is determined based on a combination of the three frame coordinates (operation 1081).

Optionally, after the first frame coordinate and the second frame coordinate are collected, subsequent frame coordinates of the sliding instruction are further collected, to determine the sliding direction of the sliding instruction based on a combination of the first and second frame coordinates and the subsequent frame coordinates.

In operation 109, the sliding instruction is determined invalid.

Since the edge area and the near-area edge are usually narrow in width, when the first frame coordinate of the sliding instruction is in the near-edge area, the sliding instruction with a sliding direction toward the edge area may be caused by the user's faulty touch and may be regarded as an invalid instruction.

In operation 110, a point coordinate is supplemented at a position in the edge area opposite to the sliding direction and symmetrical to the second frame coordinate about the first frame coordinate taken as a datum.

When the first frame coordinate of the sliding instruction is in the near-edge area, and the sliding direction of the sliding instruction is not toward the edge area, point supplement is performed on the sliding trajectory of the sliding instruction. The point supplement method is as follows: taking the first frame coordinate as the datum, supplementing the point coordinate at the position in the edge area opposite to the sliding direction and symmetrical to the second frame coordinate about the first frame coordinate.

Following illustrations are made with reference to FIG. 1. When the user performs a sliding operation and touches from the edge area toward the middle area to generate the sliding instruction, and the sliding instruction has a breakpoint with the edge area, the sliding instruction needs to be performed with the point supplement. The first frame coordinate of the sliding instruction is A, the second frame coordinate is B, the first frame coordinate A is in the near-edge area, and the sliding direction of the sliding instruction is towards the middle area. Thus, the sliding instruction meets the point supplement condition. During the point supplement, in the edge area, a point C is supplemented at a position which is at a same distance from the first frame coordinate A as the second coordinate B from the first frame coordinate A but in an opposite direction.

Optionally, the sliding instruction further includes a third frame coordinate D, then the sliding instruction after the point supplement includes the coordinates A, B, C and D.

In the touch control processing method(s) of the embodiments of the present disclosure, when it is determined that the user inputs a sliding instruction, a first frame coordinate of the sliding instruction is collected, and it is determined whether the first frame coordinate is in a near-edge area. When a determination result indicates that the first frame coordinate is in the near-edge area, a second frame coordinate of the sliding instruction is collected. With a combination of the first frame coordinate and the second frame coordinate, it is determined whether a sliding direction of the sliding instruction meets a point supplement condition. When the determination result indicates that the sliding direction meets the point supplement condition, a point coordinate is supplemented at a position in the edge area opposite to the sliding direction and symmetrical to the second frame coordinate about the first frame coordinate taken as the datum, thereby making a sliding operation corresponding to the sliding instruction smoother.

Figure 3:
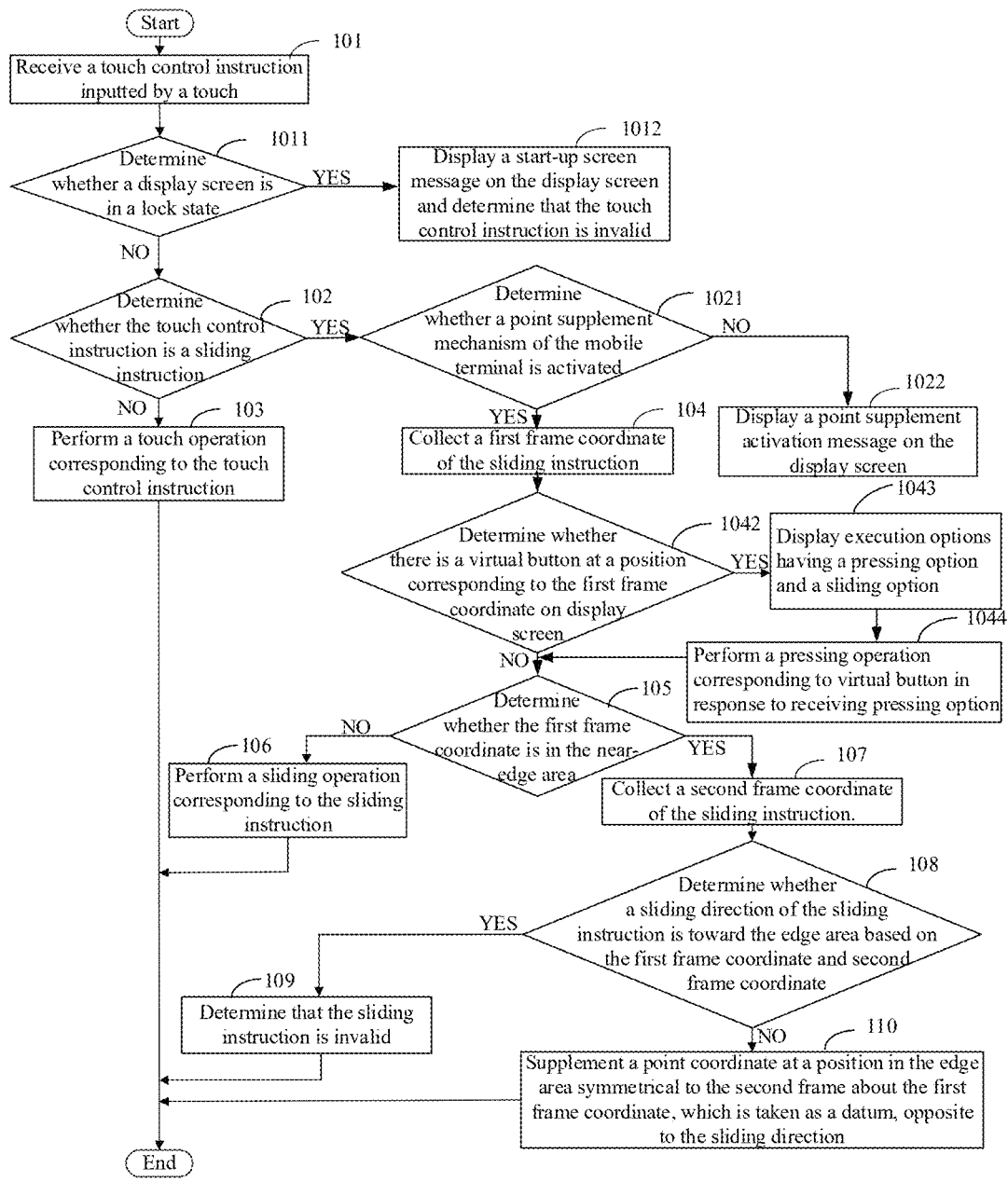
FIG. 3 is another flowchart of the touch control processing method provided by some embodiments of the present disclosure.

Please refer to FIG. 3. FIG. 3 is another flowchart of the touch control processing method provided by some embodiments of the present disclosure. Further, the above operation 110 includes the following operations.

In operation 1101, a coordinate distance between the first frame coordinate and the second frame coordinate is calculated.

Since in the configuration, a width of the edge area may be smaller than the distance between the first frame coordinate and the second frame coordinate of the sliding instruction, it is necessary to calculate the distance between the two frame coordinates first, and then execute a subsequent operation based on the calculation result.

In operation 1102, whether the coordinate distance is less than a point supplement distance is determined. If so, an operation 1103 is performed. Or else, an operation 1104 is performed.

Optionally, the point supplement distance is a distance from the first frame coordinate to an edge of the edge area away from the near-edge area. The coordinate distance between the first frame coordinate and the second frame coordinate may be greater than, equal to, or smaller than the point supplement distance.

In operation 1103, a point coordinate is supplemented at the position in the edge area opposite to the sliding direction and symmetrical to the second frame coordinate about the first frame coordinate taken as the datum.

When the coordinate distance between the first frame coordinate and the second frame coordinate is less than the point supplement distance, the coordinate distance between the first frame coordinate and the second frame coordinate is less than the distance from the first frame coordinate to the edge of the edge area away from the near-edge area. In this way, during the point supplement, the point coordinate is supplemented at the position in the edge area opposite to the sliding direction and symmetrical to the second frame coordinate about the first frame coordinate taken as the datum.

In operation 1104, the point supplement is performed in the edge area, on a side edge line of the edge area away from the near-edge area and opposite to the sliding direction.

When the coordinate distance between the first frame coordinate and the second frame coordinate is greater than or equal to the point supplement distance, then the coordinate distance between the first frame coordinate and the second frame coordinate is greater than or equal to the distance from the first frame coordinate to the edge of the edge area away from the near-edge area. In this way, during the point supplement, the point coordinate is supplemented in the edge area, on the side edge line of the edge area away from the near-edge area and opposite to the sliding direction.

In the touch control processing method(s) of the embodiments of the present disclosure, when it is determined that the user inputs a sliding instruction, a first frame coordinate of the sliding instruction is collected, and it is determined whether the first frame coordinate is in a near-edge area. When the determination result indicates that the first frame coordinate is in the near-edge area, a second frame coordinate of the sliding instruction is collected. With a combination of the first frame coordinate and the second frame coordinate, it is determined whether a sliding direction of the sliding instruction meets a point supplement condition. When the determination result indicates that the sliding direction meets the point supplement condition, a point coordinate is supplemented at a position in the edge area symmetrical to the second frame coordinate about the first frame coordinate, which is taken as the datum, and opposite to the sliding direction, thereby making a sliding operation corresponding to the sliding instruction smoother.

Figure 4:
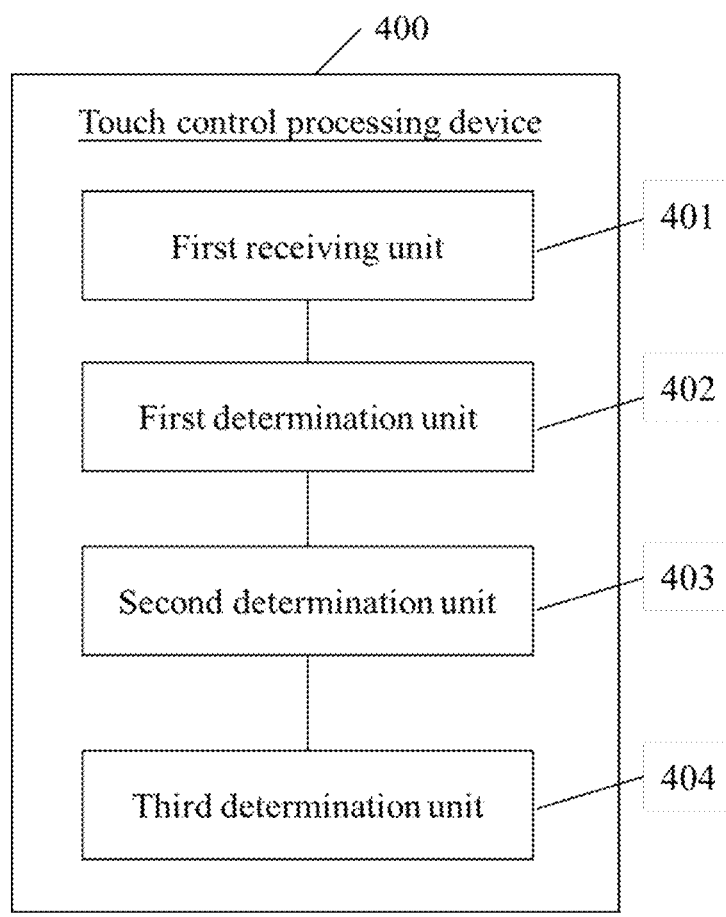
FIG. 4 is a schematic structural diagram of a touch control processing device provided by some embodiments of the present disclosure.

Please refer to FIG. 4. FIG. 4 is a schematic structural diagram of a touch control processing device provided by some embodiments of the present disclosure. The device includes:
 a first receiving unit configured to receive a touch control instruction inputted by a touch;
 a first determination unit configured to: determine whether the touch control instruction is a sliding instruction; if not, perform a touch operation corresponding to the touch control instruction, and, if so, collect a first frame coordinate of the sliding instruction;
 a second determination unit configured to: determine whether the first frame coordinate is in the near-edge area; if not, perform a sliding operation corresponding to the sliding instruction, and, if so, collect a second frame coordinate of the sliding instruction; and
 a third determination unit configured to: determine whether a sliding direction of the sliding instruction is toward the edge area based on the first frame coordinate and the second frame coordinate; if so, determine that the sliding instruction is invalid, or else, supplement, based on the first frame coordinate, a point coordinate at a position in the edge area symmetrical to the second frame coordinate about the first frame coordinate, which is taken as a datum, opposite to the sliding direction.

Optionally, the touch control processing device further includes the following units:
 a calculation unit configured to calculate a coordinate distance between the first frame coordinate and the second frame coordinate; and
 a fourth determination unit configured to determine whether the coordinate distance is smaller than a point supplement distance.

Optionally, the touch control processing device in some embodiments of the present disclosure further includes other functional units, which will not be described again here.

The touch control processing device(s) of the embodiments of the present disclosure, when determining that the user inputs a sliding instruction, collects a first frame coordinate of the sliding instruction, and determines whether the first frame coordinate is in a near-edge area. When the determination result indicates that the first frame coordinate is in the near-edge area, the touch control processing device(s) collects a second frame coordinate of the sliding instruction. With the combination of the first frame coordinate and the second frame coordinate, the touch control processing device(s) determines whether a sliding direction of the sliding instruction meets a point supplement condition. When the determination result indicates that the sliding direction meets the point supplement condition, the touch control processing device(s) supplements a point coordinate at a position in the edge area symmetrical to the second frame coordinate about the first frame coordinate, which is taken as the datum, opposite to the sliding direction, thereby making a sliding operation corresponding to the sliding instruction smoother.

In some embodiments, a computer-readable storage medium storing a plurality of instructions is further provided, and the instructions are suitable to be loaded by a processor to execute any of the above touch control processing methods.

Those of ordinary skill in the art may understand that all or part of the operations in the various methods of the above embodiments may be completed by instructing relevant hardware through a program. The program may be stored in the computer-readable storage medium. The storage medium may include: a Read Only Memory (ROM), a Random Access Memory (RAM), a magnetic disk, an optical disk, etc.

The above is a detailed introduction to the touch control processing method and device, a storage medium, and a mobile terminal provided by some embodiments of the present disclosure. Specific examples are taken to illustrate the principles and implementation methods of the present disclosure. The descriptions of the above embodiments are only for helping to understand the methods and the core ideas of the present disclosure. At the same time, for those skilled in the art, there will be changes in the specific implementation and application scope based on the ideas of the present disclosure. In summary, the content of this description should not be understood as a limitation of the present disclosure.

What is claimed is:

1. A mobile terminal, comprising: a display screen configured with an edge area and a near-edge area that are connected, the edge area is located at a peripheral edge position of the display screen, the edge area surrounds the near-edge area, a processor and a non-transitory computer-readable storage medium storing instructions, when executed by the processor, enable the mobile terminal to perform the following:
   receiving a touch control instruction inputted by a touch;
   determining whether the touch control instruction is a sliding instruction;
   in response to determining that the touch control instruction is not the sliding instruction, performing a touch operation corresponding to the touch control instruction, and
   in response to determining that the touch control instruction is the sliding instruction, collecting a first frame coordinate of the sliding instruction;
   determining whether the first frame coordinate is in the near-edge area;
   in response to determining that the first frame coordinate is not in the near-edge area, performing a sliding operation corresponding to the sliding instruction, and
   in response to determining that the first frame coordinate is in the near-edge area, collecting a second frame coordinate of the sliding instruction;
   determining whether a sliding direction of the sliding instruction is toward the edge area based on the first frame coordinate and the second frame coordinate; and
   in response to determining that the sliding direction of the sliding instruction is toward the edge area, determining that the sliding instruction is invalid, and
   in response to determining that the sliding direction of the sliding instruction is not toward the edge area, supplementing a point coordinate at a position in the edge area symmetrical to the second frame coordinate about the first frame coordinate, which is taken as a datum, opposite to the sliding direction.

2. The mobile terminal according to claim 1, wherein the instructions enable the mobile terminal to perform the following:
   wherein after receiving the touch control instruction inputted by the touch, determining whether the display screen is in a lock state; and
   in response to determining that the display screen is in the lock state, displaying a start-up screen message on the display screen and determining that the touch control instruction is invalid, and
   in response to determining that the display screen is not in the lock state, determining whether the touch control instruction is the sliding instruction.

3. The mobile terminal according to claim 1, wherein the instructions enable the mobile terminal to perform the following:
   wherein before collecting the first frame coordinate of the sliding instruction, determining whether a point supplement mechanism of the mobile terminal is activated; and
   in response to determining that the point supplement mechanism of the mobile terminal is activated, collecting the first frame coordinate of the sliding instruction, and
   in response to determining that the point supplement mechanism of the mobile terminal is not activated, displaying a point supplement activation message on the display screen.

4. The mobile terminal according to claim 1, wherein the instructions enable the mobile terminal to perform the following:
   wherein after collecting the first frame coordinate of the sliding instruction, determining whether the first frame coordinate is in the edge area; and in response to determining that the first frame coordinate is in the edge area, performing the sliding operation corresponding to the sliding instruction, and
   in response to determining that the first frame coordinate is not in the edge area, determining whether the first frame coordinate is in the near-edge area.

5. The mobile terminal according to claim 1, wherein the instructions enable the mobile terminal to perform the following:
   wherein after collecting the first frame coordinate of the sliding instruction, determining whether there is a virtual button at a position corresponding to the first frame coordinate on the display screen;
   in response to determining that there is no virtual button at the position corresponding to the first frame coordinate on the display screen, determining whether the first frame coordinate is in the near-edge area, and in response to determining that there is the virtual button at the position corresponding to the first frame coordinate on the display screen, displaying one or more execution options on the display screen, wherein the execution options comprise a pressing option and a sliding option, the pressing option corresponds to the virtual button, and the sliding option corresponds to the sliding instruction;
   performing, in response to receiving the pressing option, a pressing operation corresponding to the virtual button; and
   determining, in response to receiving the sliding option, whether the first frame coordinate is in the near-edge area.

6. The mobile terminal according to claim 1, wherein the instructions enable the mobile terminal to perform the following:
   wherein after collecting the first frame coordinate of the sliding instruction, determining whether there is a virtual button at a position corresponding to the first frame coordinate on the display screen;
   in response to determining that there is no virtual button at the position corresponding to the first frame coordinate on the display screen, determining whether the first frame coordinate is in the near-edge area; and
   in response to determining that there is the virtual button at the position corresponding to the first frame coordinate on the display screen, determining whether a priority level corresponding to the virtual button is higher than a priority level corresponding to the sliding instruction, and in response to determining that the priority level corresponding to the virtual button is higher than the priority level corresponding to the sliding instruction, performing a pressing operation corresponding to the virtual button, and in response to determining that the priority level corresponding to the virtual button is not higher than the priority level corresponding to the sliding instruction, determining whether the first frame coordinate is in the near-edge area.

7. The mobile terminal according to claim 1, wherein the instructions enable the mobile terminal to perform the following:

wherein after collecting the second frame coordinate of the sliding instruction, determining whether the sliding direction of the sliding instruction is toward the edge area based on the first frame coordinate and the second frame coordinate;

in response to determining that the sliding direction of the sliding instruction is toward the edge area, determining that the sliding instruction is invalid, and in response to determining that the sliding direction of the sliding instruction is not toward the edge area, calculating a coordinate distance between the first frame coordinate and the second frame coordinate;

determining whether the coordinate distance is less than a point supplement distance; and in response to determining that the coordinate distance is less than the point supplement distance, supplementing the point coordinate at the position in the edge area symmetrical to the second frame coordinate about the first frame coordinate, which is taken as the datum, opposite to the sliding direction, and in response to determining that the coordinate distance is not less than the point supplement distance, supplementing the point coordinate at the position in the edge area on a side edge line of the edge area away from the near-edge area opposite to the sliding direction.

8. A mobile terminal, comprising: a display screen configured with an edge area and a near-edge area that are connected, and the edge area is located at a peripheral edge position of the display screen, the edge area surrounds the near-edge area, a processor and a non-transitory computer-readable storage medium storing instructions, when executed by the processor, enable the mobile terminal to perform the following:

receiving a touch control instruction inputted by a touch;
determining whether the display screen is in a lock state;
in response to determining that the display screen is in the lock state, displaying a start-up screen message on the display screen and determining that the touch control instruction is invalid, and in response to determining that the display screen is not in the lock state, determining whether the touch control instruction is a sliding instruction;

in response to determining that the touch control instruction is not the sliding instruction, performing a touch operation corresponding to the touch control instruction, and in response to determining that the touch control instruction is the sliding instruction, collecting a first frame coordinate of the sliding instruction;

determining whether the first frame coordinate is in the near-edge area;

in response to determining that the first frame coordinate is not in the near-edge area, performing a sliding operation corresponding to the sliding instruction, and in response to determining that the first frame coordinate is in the near-edge area, collecting a second frame coordinate of the sliding instruction;

determining whether a sliding direction of the sliding instruction is toward the edge area based on the first frame coordinate and the second frame coordinate; and in response to determining that the sliding direction of the sliding instruction is toward the edge area, determining that the sliding instruction is invalid, and in response to determining that the sliding direction of the sliding instruction is not toward the edge area, supplementing a point coordinate at a position in the edge area symmetrical to the second frame coordinate about the first frame coordinate, which is taken as a datum, opposite to the sliding direction.

9. The mobile terminal according to claim 8, wherein the instructions enable the mobile terminal to perform the following:

wherein before collecting the first frame coordinate of the sliding instruction, determining whether a point supplement mechanism of the mobile terminal is activated;

and in response to determining that the point supplement mechanism of the mobile terminal is activated, collecting the first frame coordinate of the sliding instruction.

10. The mobile terminal according to claim 8, wherein the instructions enable the mobile terminal to perform the following:

wherein before collecting the first frame coordinate of the sliding instruction, determining whether a point supplement mechanism of the mobile terminal is activated; and in response to determining that the point supplement mechanism of the mobile terminal is not activated, displaying a point supplement activation message on the display screen.

11. The mobile terminal according to claim 8, wherein the instructions enable the mobile terminal to perform the following:

wherein after collecting the first frame coordinate of the sliding instruction, determining whether the first frame coordinate is in the edge area; and in response to determining that the first frame coordinate is in the edge area, performing the sliding operation corresponding to the sliding instruction.

12. The mobile terminal according to claim 8, wherein the instructions enable the mobile terminal to perform the following:

wherein after collecting the first frame coordinate of the sliding instruction, determining whether the first frame coordinate is in the edge area; and in response to determining that the first frame coordinate is not in the edge area, determining whether the first frame coordinate is in the near-edge area.

13. The mobile terminal according to claim 8, wherein the instructions enable the mobile terminal to perform the following:

wherein after collecting the second frame coordinate of the sliding instruction, determining whether the sliding direction of the sliding instruction is toward the edge area based on the first frame coordinate and the second frame coordinate; and in response to determining that the sliding direction of the sliding instruction is toward the edge area, determining that the sliding instruction is invalid, and in response to determining that the sliding direction of the sliding instruction is not toward the edge area, calculating a coordinate distance between the first frame coordinate and the second frame coordinate.

14. The mobile terminal according to claim 13, wherein the instructions enable the mobile terminal to perform the following:
wherein after calculating the coordinate distance between the first frame coordinate and the second frame coordinate, determining whether the coordinate distance is less than a point supplement distance; and
in response to determining that the coordinate distance is less than the point supplement distance, supplementing the point coordinate at the position in the edge area symmetrical to the second frame coordinate about the first frame coordinate, which is taken as the datum, opposite to the sliding direction, and
in response to determining that the coordinate distance is not less than the point supplement distance, supplementing the point coordinate at the position in the edge area on a side edge line of the edge area away from the near-edge area opposite to the sliding direction.

15. The mobile terminal according to claim 8, wherein the first frame coordinate is a coordinate point of a starting position of the sliding instruction.

16. The mobile terminal according to claim 8, wherein the instructions enable the mobile terminal to perform the following:
wherein after collecting the second frame coordinate of the sliding instruction, continuing to collect a third frame coordinate of the sliding instruction; and
determining whether the sliding direction of the sliding instruction is toward the edge area based on the first frame coordinate, the second frame coordinate, and the third frame coordinate.

17. The touch control processing method according to claim 8, wherein the instructions enable the mobile terminal to perform the following:
wherein after collecting the second frame coordinate of the sliding instruction, continuing to collect one or more subsequent frame coordinates of the sliding instruction; and
determining whether the sliding direction of the sliding instruction is toward the edge area based on the first frame coordinate, the second frame coordinate, and the one or more subsequent frame coordinates of the sliding instruction.

* * * * *